(12) United States Patent
Matheis

(10) Patent No.: US 12,403,533 B2
(45) Date of Patent: Sep. 2, 2025

(54) CUTTING TOOL

(71) Applicant: Guehring KG, Albstadt (DE)

(72) Inventor: Klaus Matheis, Sauldorf/Rast (DE)

(73) Assignee: Guehring KG, Albstadt (DE)

( * ) Notice: Subject to any disclaimer, the term of this patent is extended or adjusted under 35 U.S.C. 154(b) by 766 days.

(21) Appl. No.: 17/180,971

(22) Filed: Feb. 22, 2021

(65) Prior Publication Data

US 2021/0323075 A1 Oct. 21, 2021

Related U.S. Application Data

(63) Continuation of application No. PCT/EP2019/071542, filed on Aug. 12, 2019.

(30) Foreign Application Priority Data

Aug. 21, 2018 (DE) ...................... 10 2018 214 123.1

(51) Int. Cl.
*B23B 27/16* (2006.01)
(52) U.S. Cl.
CPC ................................ *B23B 27/1614* (2013.01)
(58) Field of Classification Search
CPC ....... B23C 5/22; B23C 5/2204; B23C 5/2226; B23C 5/2239; B23C 5/2252; B23C 5/2265; B23C 5/2278; B23C 5/2306; B23C 5/24; B23C 5/2462; B23C 5/2472; B23C 5/2475; B23C 5/2489; B23C 2210/168; B23C 2245/04; B23B 27/1655; B23B 29/03; B23B 29/034; B23B 29/03403; B23B 29/03407; B23B 29/0341; B23B 29/22; B23B 2260/038; B23B 29/03417;
(Continued)

(56) References Cited

U.S. PATENT DOCUMENTS 2,903,783 A * 9/1959 Kralowetz ................ B23C 5/22
407/112
3,270,396 A * 9/1966 Williams ................ B23B 29/04
407/50
(Continued)

FOREIGN PATENT DOCUMENTS

DE 1 752 498 A1 5/1971
DE 101 44 923 A1 3/2003
(Continued)

OTHER PUBLICATIONS

DPMAregister Print Out dated Feb. 23, 2021.
(Continued)

*Primary Examiner* — Nicole N Ramos
*Assistant Examiner* — Eric Daniel Whitmire
(74) *Attorney, Agent, or Firm* — Brown & Brown IP Law PLLC

(57) ABSTRACT

A cutting tool having a main body (4) extending along a longitudinal central axis (9) and a cutting insert (1), which is held on the main body (4) in an axially and/or radially positionally-adjustable manner and can be tensioned by means of a clamping claw (3). The cutting insert (1) is held by a clamping holder (2), which is held in a positionally-adjustable manner on the main body (4), and which can be tensioned on the main body (4) by means of the clamping claw (3) pressing against the cutting insert (1).

21 Claims, 3 Drawing Sheets

(58) Field of Classification Search
CPC ........ B23B 29/03435; B23B 29/03439; B23B 29/03446
See application file for complete search history.

(56) References Cited

U.S. PATENT DOCUMENTS

| | | | |
|---|---|---|---|
| 3,332,130 A | | 7/1967 | Armstrong |
| 4,309,132 A | * | 1/1982 | Adamson .............. B23C 5/2208 407/38 |
| 4,353,669 A | * | 10/1982 | Striegl ................. B23D 77/048 408/713 |
| 4,547,100 A | * | 10/1985 | Naccarato ............. B23C 5/2472 407/46 |
| 4,627,771 A | | 12/1986 | Kieninger |
| 5,149,233 A | | 9/1992 | Kress et al. |
| 5,217,333 A | | 6/1993 | Hunt |
| 6,254,319 B1 | * | 7/2001 | Maier ................. B23D 77/044 407/45 |
| 2003/0053872 A1 | | 3/2003 | Schlagenhauf |
| 2004/0156688 A1 | * | 8/2004 | Matheis ............... B23C 5/2462 407/79 |
| 2009/0175693 A1 | * | 7/2009 | Jansson ............... B23C 5/2479 407/41 |
| 2010/0232890 A1 | * | 9/2010 | Hughes ................ B23C 5/2472 407/110 |
| 2015/0217387 A1 | | 8/2015 | Kress |

FOREIGN PATENT DOCUMENTS

| | | |
|---|---|---|
| DE | 10 2012 018 643 A1 | 4/2014 |
| EP | 0 126 432 A1 | 11/1984 |
| EP | 0 381 924 A2 | 8/1990 |
| GB | 1 219 333 A | 1/1971 |
| WO | 98/39127 A2 | 9/1998 |
| WO | 2010/104635 A1 | 9/2010 |
| WO | 2014/041130 A1 | 3/2014 |

OTHER PUBLICATIONS

International Search Report and Written Opinion (Application No. PCT/EP2019/071542) dated Oct. 21, 2019 (with English translation).

* cited by examiner

CUTTING TOOL

The present invention deals with a cutting tool, in the case of which the cutting insert can be fixed to a main body via a clamping claw.

For example EP 0 381 924 A2 shows a cutting tool of this type. To fix a cutting attachment to a main body of the cutting tool, EP 0 381 924 A2 proposes to use a clamping claw, which is pressed against the main body by means of a tensioning screw and thereby pushes with a protruding end section against the cutting attachment, which is tensioned flat against a bottom surface of a recess in the main body thereby. The disadvantage of this assembly is that a fine adjustment of the cutting attachment is not possible.

In comparable manner, which further develops this subject matter, DE 101 44 923 A1 discloses a cutting tool, in the case of which a cutting insert, in particular an indexable insert, is received in a positive manner in a pocket of a clamping claw, which is positionally adjustable relative to a main body of the cutting tool in the axial and radial direction. The clamping claw tensions the cutting insert against a support surface at the main body. In the case of an overall space-saving design, the cutting tool allows for a relatively simple fixation and position adjustment of a cutting insert via the clamping claw at the main body. The clamping claw is to be loosened or released for a cutting insert change. A cutting insert change thus always requires a new position adjustment of the clamping claw.

The invention is now based on the object of further developing a cutting tool of the above-described type in such a way that the arrangement of a cutting insert in a predefined position at the main body can be accomplished without a new adjustment when changing a cutting insert.

This object is solved by means of a cutting tool comprising the features of claim 1. Preferred further developments are subject matter of dependent claims.

Analogously to the cutting tool known from DE 101 44 923 A1, a cutting tool according to the invention, which can be embodied, e.g., as drilling, turning, milling, reaming tool or the like, has a main body, which extends along a longitudinal central axis, and a cutting insert, which is held on the main body in an axially and/or radially positionally adjustable manner, and which can be fixed by means of a clamping claw.

In a manner, which is known per se to the person of skill in the art, the main body can have a shaft section comprising a so-called HSK (short for: hollow shaft cone) shaft for coupling to a module of a modular tool system or to a machine spindle. In this case, the main body can be functionally divided into the shaft section and an axially adjacent cutting part, wherein the cutting insert is arranged at the cutting part.

In contrast to the cutting tool known from DE 101 44 923 A1, the cutting insert in the case of the cutting tool according to the invention is not directly tensioned against the main body via a clamping claw, but via a clamping holder, which is secured to the main body in a positionally adjustable manner. Due to the fact that the axial and/or radial position adjustment of the cutting insert thus takes place indirectly via the clamping holder, which is arranged at the main body in a positionally adjustable manner, the function of the clamping claw is limited to the clamping fixation of the cutting insert (via the clamping holder) to the main body. Once it is performed, it is thus possible to maintain a position adjustment of the clamping holder even when the clamping claw is loosened or released to change the cutting insert.

The cutting tool according to the invention is thus characterized in that the function of the axial and/or radial position adjustment and determination of the clamping holder at the main body on the one hand, and the function of the clamping fixation of the cutting insert relative to the main body on the other hand, are solved separately. The cutting insert can thus be changed without having to perform a position adjustment again. Via the clamping claw, the clamping holder, which is arranged independently thereof at the main body, experiences an additional non-positive securing to the main body.

In a preferred embodiment, the clamping claw is screw-connected to the main body by means of a tensioning screw, which penetrates the clamping holder. The clamping screw penetrates with a sufficient play through a hole in the clamping holder, so that the clamping holder can be displaced within limits for the axial and/or radial position adjustment with respect to the tensioning screw. If the tensioning screw is tightened, it presses the clamping claw onto the cutting insert, which is thus pressed onto the clamping holder, whereby the latter is pressed onto a bearing surface on the main body side. The clamping claw, the cutting insert, and the clamping holder are thus pressed against the main body by means of the tensioning screw and are thus fixed to the main body. As will be described in more detail later, a countersink can be provided in the clamping claw, which cooperates with a conical surface at the head of the tensioning screw and which always distinctly positions the tensioning screw relative to the clamping claw. An alignment of the clamping claw with respect to the tensioning screw, which is positioned at the main body by means of screw connection, is thus attained in a reproducible manner. The clamping claw tensions the cutting insert against the clamping holder by means of these measures.

It is a further advantage of the use of the clamping claw that the cutting insert, such as, e.g., a cutting plate, in particular an indexable cutting insert, no longer requires a central through bore in order to accomplish the securing to the main body. The smallest cutting plates can thus also be used, which would otherwise be weakened too much by means of a central aperture. The strain on the cutting insert, in particular an inserted cutting plate, can take place in such a way that said cutting insert abuts on the clamping holder over a large area. Contact tensions can be minimized thereby, which is advantageous in particular when extremely hard cutting materials, such as, e.g., hard metal, ceramic materials, or cermet materials are used.

The main body further preferably has a receiving pocket, which receives the clamping holder so as to be displaceable in a direction transversely to the longitudinal central axis, and further preferably receives it captively in the axial direction. A receiving pocket designed in this way contributes to a simple assembly of the clamping holder to the main body and thus to a shortening of the set-up time.

The receiving pocket can form a preferably flat bearing surface of the receiving pocket, which extends in the displacement direction of the clamping holder and against which the clamping holder can be tensioned over a large area. The displacement direction can be parallel to a radial and/or axial direction or, viewed vectorially, respectively, can be understood as addition of direction vectors, one of which runs radially, and one of which runs axially. However, the displacement does not have to take place in a plane, in which the longitudinal central axis runs, but can also take place in a plane parallel to the plane, which is spanned by a radial vector and the longitudinal central axis. In the case of a flat abutment of the clamping holder on the bearing surface on the main body side, the tensions in the main body decrease, so that less distortion can also be expected. As a whole, the flow of force from the functional cutting edge to the support body can be optimized even further by means of these measures.

In a preferred embodiment, the main body can furthermore have a guide opening, which linearly guides the clamping claw to the clamping holder, e.g. by means of a positive connection. It is attained by means of a positive guidance of the clamping claw in the guide opening that the clamping claw can be removed from the guide opening only in one direction, i.e. the guide direction. Even if the tensioning screw is completely released for disassembly, the clamping claw can thus be held in the guide opening in a direction transversely to the guide direction.

When the cutting tool has the above-mentioned receiving pocket as well as the guide opening, which linearly guides the clamping claw, it is particularly advantageous when the direction of extension of the guide opening is inclined to the bearing surface of the receiving pocket in such a way that the clamping claw presses the clamping holder via the cutting insert against a stop on the main body side. This stop on the main body side can be an adjusting element, e.g. an adjusting screw, of an adjusting device, which is provided on the main body side and which provides for an axial and/or radial position adjustment of the clamping holder at the main body. By means of a suitable selection of the angle of inclination of the direction of extension of the guide opening with respect to the bearing surface of the receiving pocket, a force component, which presses the clamping holder against the above-mentioned stop on the main body side, can be generated in response to a tensioning between clamping claw and clamping holder.

The above-described measures contribute to a high position accuracy of the clamping holder at the main body and to a simple assembly.

The securing of the clamping holder to the main body (after position adjustment has taken place) can take place via a securing device, which is independent of the clamping claw and which is integrated into the main body. This securing device can be formed from a clamping screw, which is screwed-connected to the main body and which presses the clamping holder against the main body. As already mentioned, it is attained by means of the clamping claw-independent securing of the clamping holder to the main body that even if the clamping claw is released, the clamping holder maintains its position, which is adjusted in the axial and/or radial direction, in the main body, without any changes. If the clamping holder is secured in this way, the cutting insert, for example a cutting plate, can be removed from the clamping holder by means of loosening or releasing the clamping claw, without having to remove the clamping holder from the main body. It is possible thereby to only change the cutting insert, if necessary, without having to subsequently adjust the entire tool anew. The use of a clamping screw to secure the clamping holder to the main body contributes to keeping the costs for the cutting tool low as a whole.

In the interest of the most exact positioning of the cutting insert in the axial and/or radial direction at the main body, the cutting insert can be arranged in a cutting insert seat at the clamping holder in a positionally immobile manner relative to the clamping holder, e.g. by means of a positive connection. If the cutting insert is arranged in a positionally immobile manner at the clamping holder, it can be easily removed and be installed again, in particular when the clamping holder is fixed to the main body.

In particular in this embodiment, the cutting insert, as already mentioned, can advantageously be formed by a cutting plate, in particular an indexing insert. Cutting plates of this type are well-known in the chip removal as components of corresponding tools.

For the axial and/or radial position adjustment of the clamping holder, the cutting tool according to the invention can have an adjusting device, which is integrated into the clamping holder, for adjusting the radial and/or axial position of the clamping holder relative to the longitudinal a central axis of the main body. For example, the adjusting device on the clamping holder side is formed from an adjusting screw, which is screw-connected to the clamping holder and which presses against the main body. A finely tuned adjustment is possible by means of the reduction of the screw thread with respect to the displacement of the adjusting screw in its axial direction and the additionally possible adaptation of the wedge angle of the tip of the adjusting screw and of the clamping holder.

In the alternative or in addition to the above-mentioned adjusting device, which is provided on the clamping holder side, the cutting tool can have an adjusting device, which is integrated into the main body, for adjusting the radial and/or axial position of the clamping holder relative to the longitudinal central axis. An adjusting device of this type can be formed from an adjusting screw, which is screw-connected to the main body and which presses against the clamping holder. Ultimately, this adjusting device also serves for a shortening of conversion times by means of the defined reception of the clamping holder in the main body.

The invention will be described below with the help of the enclosed drawings on the basis of a preferred embodiment.

IN THE DRAWINGS

Figure 1:
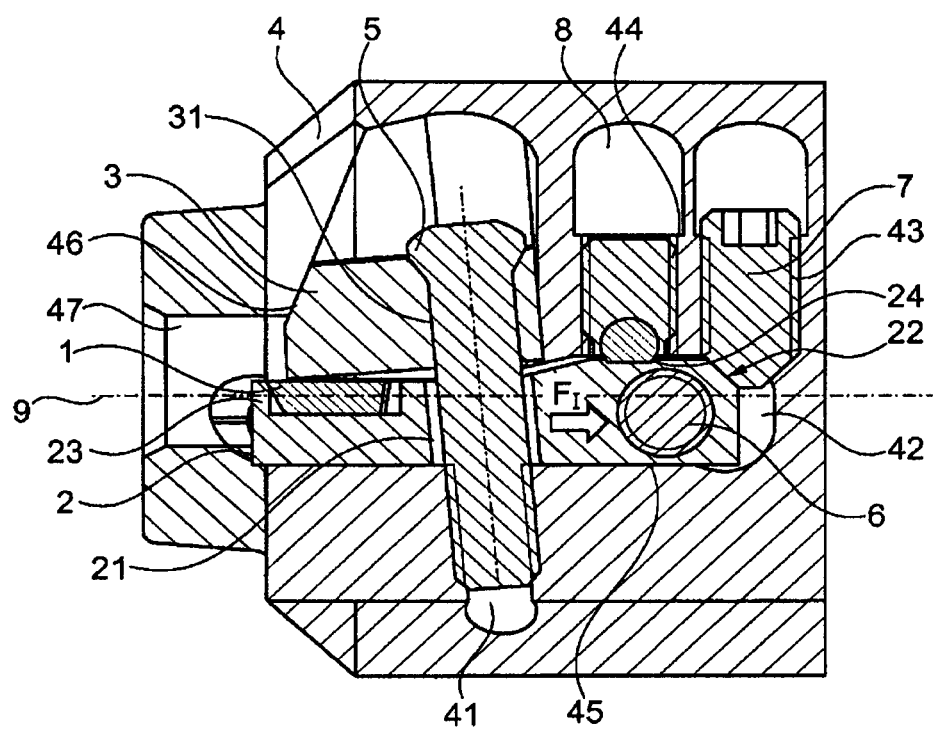
FIG. 1 shows a partially longitudinally cut view of a cutting tool according to the invention.
Figure 2:
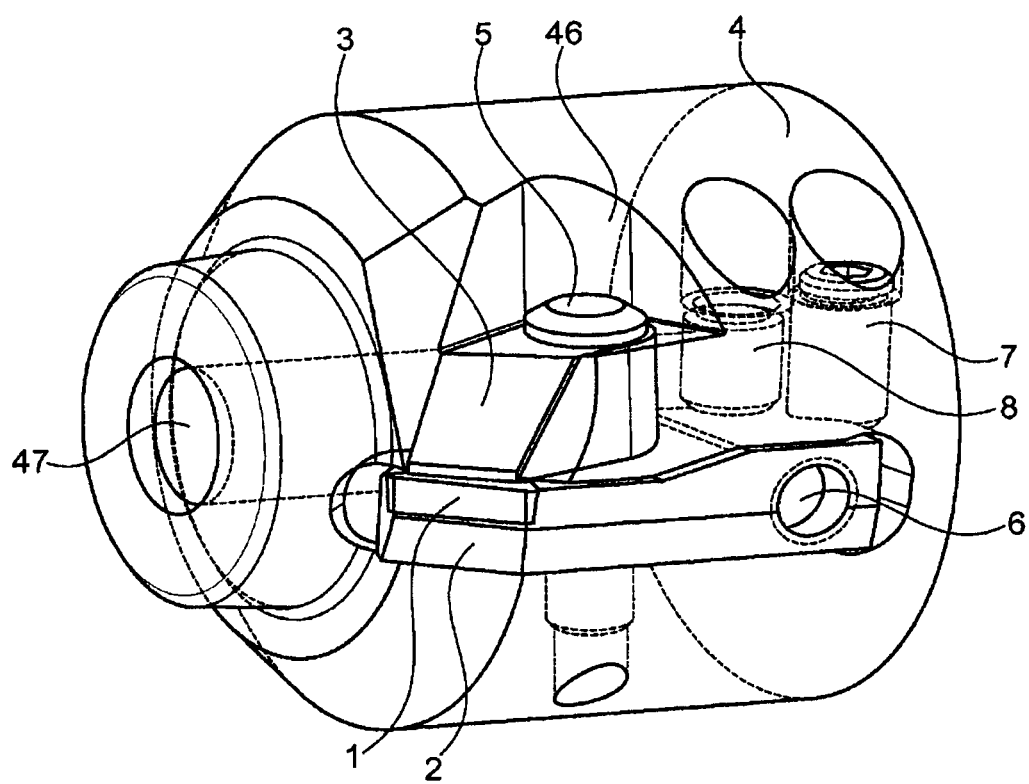
FIG. 2 shows a perspective side view of the cutting tool according to the invention.

The cutting tool shown in FIGS. 1 and 2, which can be used, for example, for a turning, drilling, or milling machining, has a main body 4, which is only shown incompletely in the figures and which extends along a rotational or longitudinal central axis 9. As can be seen from FIGS. 1 and 2, the main body 4 is formed from an essentially rotationally symmetrical body. Even though this is not shown here, the main body can have a shaft section comprising, for example, a so-called HSK (hollow shaft cone) shaft for coupling the cutting tool to a drive spindle of a machine tool, in a manner, which is known per se to the person of skill in the art. FIGS. 1 and 2 show that, based on the cutting tool known from DE 101 44 923 A1, the main body has a centrical receiving opening 47 for receiving a further cutting tool, which is not shown here, e.g. a reamer.

In addition, an assembly, which will be described in more detail below and which is formed from a cutting insert (here in the form of a cutting plate 1), a clamping holder 2, and a clamping claw 3, and which is arranged in a positionally-adjustable manner at the main body, can be seen in FIGS. 1 and 2.

In the preferred embodiment, the cutting insert is formed as a cutting plate 1, in particular as indexable insert. In the shown embodiment, the cutting plate 1 is arranged in a positionally immobile manner in a cutting insert seat 23 at a clamping holder 2 by means of a positive connection.

The clamping holder 2 has an outer shape, which is based on a cuboid. As can in particular be seen in FIGS. 1 and 3, the clamping holder 2 is virtually completely cuboidal in the front (on the left in the figures) and rear (right) section, wherein the rear section has a larger thickness than the front section due to a wedge-shaped central section. On the rear side (on the right in FIG. 1), the clamping holder 2 has a trough-shaped recess 24, in which a pressure piece of a (later-described) clamping screw 8 is arranged. In a non-illustrated modification, the clamping holder 2 can, for example, be formed in a wedge-shaped manner over its entire length.

The cutting plate 1 is received in a positionally immobile manner in a cutting insert seat 23 at the clamping holder 2 by means of a positive connection. The cutting plate 1 is thus distinctly fixed relative to the clamping holder 2. The clamping claw 3 is pressed onto the cutting plate 1 by means of the tensioning screw 5 in order to tension the cutting plate 1 against the clamping holder 2.

The main body 4 has a clamping thread 41 for the tensioning screw, a receiving pocket 42 for the clamping holder 2 (comprising a flat bearing surface 45 for the clamping holder, a threaded bore 43 for a (later described) adjusting screw 7, a threaded bore 44 for a (later described) clamping screw 8, a centric receiving opening 47 for a further tool, and a guide opening 46 for the clamping claw 3. As can be seen well from FIGS. 1 and 2, the clamping claw 3 can be introduced into the main body in a linear direction (from the top in FIGS. 1 and 2) and can be tensioned against said main body via the tensioning screw 5.

The clamping holder 2 is received in the receiving pocket 42 in the main body 4, which receives the clamping holder 2 such that it can be inserted in a direction transversely to the longitudinal central axis 9 (perpendicular to the drawing plane in FIG. 1) and can be positionally adjusted in the radial and axial direction. A (later described) adjusting screw 6 adjusts the clamping holder against the main body 4 in a direction transversely to the longitudinal central axis 9 or in the radial direction of the main body 4, respectively.

The receiving pocket 42 in the main body 4 is constructed to have a similar shape as the outer shape of the clamping holder 2 so that the clamping holder 2 can be inserted in the direction transversely to the longitudinal central axis 9. Even though the clamping holder 2 can be displaced to a limited extent in the receiving pocket in the axial direction is due to the two cuboidal sections and the wedge-shaped central section connecting them, it is arranged in a captive manner. Analogously to the above-described receiving pocket for the clamping holder 2, a guide opening for the clamping claw 3 is also provided in the embodiment. The guide opening transitions into the receiving pocket 42 for the clamping holder 2 and guides the clamping claw 3 towards the clamping holder 2 in a straight line.

After an axial and/or radial position adjustment has taken place, a clamping screw 8, which is screwed into a threaded bore 44 in the main body 4, clamps the clamping holder 2 against the main body 4. The clamping screw 8 is embodied as a grub screw.

FIGS. 1 to 5 show the clamping claw 3. As can be seen from the figures, the outer shape of the clamping claw 3 forms a prismatic cuboid, which, on the one side (on the right in FIGS. 1, 3, and 4), ends in a half cylinder around a through hole 31 for the tensioning screw 5, and transitions into a beveled prismatic surface on its other side (on the left in FIGS. 1 to 4). In the top view of FIG. 3, the clamping claw additionally tapers to the other side. The shown shape has the advantage of a high stability with comparatively small space requirement; however, the clamping claw can also be designed differently, depending on the conditions at the tool, as long as it reliably transfers a force exerted by the tensioning screw 5 to the cutting plate 1 and holds the latter securely.

In the embodiment, the clamping claw 3 is pressed onto the clamping holder 2 via the cutting plate 1 by means of a tensioning screw 5. As can be seen in FIG. 1, the tensioning screw 5 passes through the through hole 31 in the clamping claw 3 and a further through hole 21 in the clamping holder 2, in order to be screwed into the clamping thread 41 in the main body 4. The clamping claw 3 presses against the cutting plate 1. As can be seen in FIG. 1, the through hole 31 has a countersink, so that the tensioning screw 5 is centered in the clamping claw 3 when being tightened. As can be seen from FIG. 1, the through holes 21, 31 and the threaded hole 41 are inclined against the radial direction of the main body, so that the tensioning screw 5 tensions the clamping 3 in a slightly slanted manner in such a way that it abuts against the front side (FIG. 1: left) further below, and against the cutting plate 1. In addition to a main force component (not shown in the figure), which presses the clamping claw 3 onto the cutting plate 1 in the radial direction, and thus the cutting plate 1 onto the clamping holder 2, and the clamping holder 2 onto the bearing surface 45 in the main body 4, this results in a (smaller) force component Fa at the bearing point of the clamping claw 3 on the cutting insert 1, which presses the cutting plate 1 into the cutting insert seat at the clamping holder 2, and moreover presses the clamping holder 2 against the adjusting screw 7 in the axial direction. For the more concise clarification, this force component in FIG. 1 is not illustrated at the location of its creation, but in the clamping holder 2, on which it acts.

The adjusting screws 6 and 7 are provided as adjusting devices for the axial and/or radial position adjustment.

The adjusting screw 7 is screwed into the threaded bore 43 in the main body 4, and presses against a corresponding rear wedge surface 22 of the clamping holder 2. If the adjusting screw 7 is further screwed in or advanced, respectively, it presses the clamping holder 2 and the cutting plate 1 connected thereto forward via the wedge surface 22 (to the left in FIG. 1). As can be seen from FIG. 3, the wedge surface 22 is moreover designed in a skewed manner at the clamping holder 2, so that when advancing the adjusting screw 7, the clamping holder 2 is simultaneously also displaced into the receiving pocket 42 (perpendicularly into the drawing plane in FIG. 1, to the top in FIG. 3). On the one hand, the clamping holder 2 is thus tensioned in the receiving pocket 42, and, on the other hand, against the adjusting screw 6. The above-described adjustment into the receiving pocket 42 can thereby be limited via the adjusting screw 6. This adjusting screw 7 serves as an above-mentioned stop on the main body side, which absorbs the above-mentioned force $F_J$.

After the axial alignment of the clamping holder 2 by means of the adjusting screw 7, the adjusting screw 6 is screwed in to the extent that it secures the clamping holder 2 in the radial direction, in that it presses against a radial stop surface in the receiving pocket 42. It thereby displaces or tensions, respectively, the clamping holder 2 against the main body 4 and the adjusting screw 7 in the radial direction.

After the above-described axial and/or radial position adjustment by means of the adjusting screws 6 and 7, the clamping holder 2 is secured by means of the clamping screw 8, which presses against the bottom of the trough-shaped recess 24 in the clamping holder 2 via a pressure piece. In this state, the cutting plate 1 can be tensioned by means of the clamping claw 3, whereby the clamping holder 2 experiences an additional tensioning against the main body.

While the adjusting screws 6 and 7 secure the alignment of the clamping holder 2 and thus of the cutting insert 1, as described above, the tensioning screw 5 in the clamping claw 3 centers them during the tightening via a countersink in the upper section of the through hole 31 in the clamping claw 3. The position of the clamping claw 3 is concisely secured in the main body 4 by means of this centering and the additional positive connection in the guide opening. As can be seen from FIG. 1, the tensioning screw 5 additionally penetrates through the hole 21 in the clamping holder 2 with comparatively large play. The clamping holder can thus be aligned without interference by the tensioning screw 5, and the tensioning screw 5 can then be tightened without any problems, after the clamping holder and the cutting plate are located at the desired position. The clamping claw 3 tensions the clamping holder 2 with respect to the main body 4 by means of the tightening.

As can be seen from the above description and from FIG. 1, the embodiment shown here results in a statical correspondence of the securing of the clamping body 2 and of the cutting plate 1, which is arranged therein in a positionally immobile manner, relative to the main body 4. If required, the tensioning screw 5 (and thus the clamping claw 3), the adjusting screw 6, or the adjusting screw 7, can thus optionally be released, without changing the position of the cutting plate 1, because the clamping holder is still held securely via the clamping screw 8. Vice versa, the position of the cutting plate 1 also does not change when the clamping screw 8 is released, while the tensioning screw 5 as well as both adjusting screws 6 and 7 remain unchanged.

FIG. 2 shows a perspective side view of the cutting tool according to the invention. The receiving opening 47 for possible auxiliary tools can be seen more clearly in FIG. 2 than in FIG. 1, and the shape of the clamping claw 3 and of the corresponding guide opening, due to the perspective illustration. As can be seen from this figure, the clamping claw 3 can be inserted into the guide opening from the top, namely in the direction of the axis of the tensioning screw 5, in the embodiment shown in FIG. 2. As can be seen even better from FIGS. 3 and 5, the clamping claw 3 can essentially move only in one direction, namely the axial direction of the tensioning screw, relative to the main body 4, when the clamping claw 3 and the corresponding guide opening furthermore tapers from the location of the through hole 31 for the tensioning screw 5 towards the support on the cutting insert.

Figure 3:
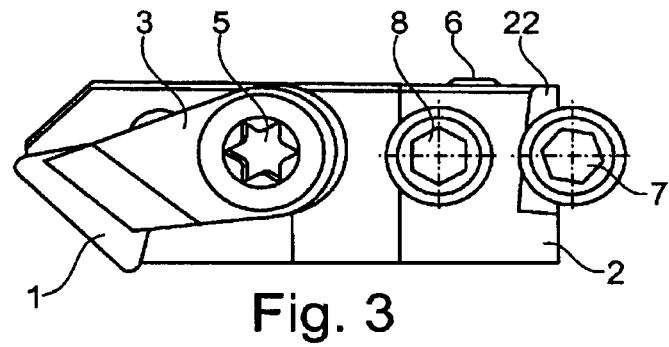
FIG. 3 shows a top view of an assembly formed from a clamping holder, a cutting insert, and a clamping claw, which is arranged in a positionally-adjustable manner at a main body of the cutting tool.

FIG. 3 shows a top view of the assembly, which is formed from the cutting insert 1, the clamping holder 2, the clamping claw 3, and the tensioning, adjusting, and clamping screws 5 to 8, and which is arranged in a positionally adjustable manner at a main body of the cutting tool, thus an assembly of all parts received in the main body 4, wherein the main body 4 itself is omitted for simplification purposes. It can be seen better from FIG. 3 that the wedge surface 22, which has already been mentioned with respect to FIG. 1, runs at an incline to the longitudinal axis of the main body 4 and the clamping holder 2, which is aligned parallel thereto. By screwing in ("advancing") the adjusting screw 7, the clamping holder 2 can thus be displaced radially to the main body 4, namely to the top in FIG. 3, and simultaneously (see FIG. 1) to the front, thus to the left in FIGS. 1 to 3. As soon as the adjusting screw 7 protrudes into the pocket of the clamping holder 2, which is defined by the adjusting surface 22, the clamping holder 2 is moreover secured against falling out by means of this screw 7 and is adjusted by it.

Figure 4:
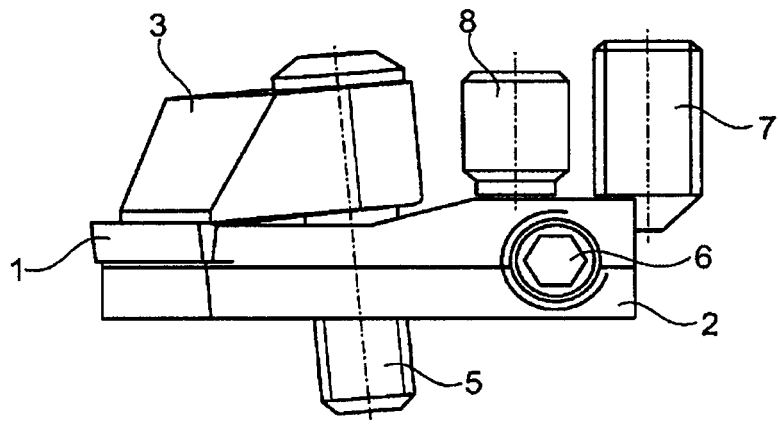
FIG. 4 shows a side view of the assembly shown in FIG. 3.
Figure 5:
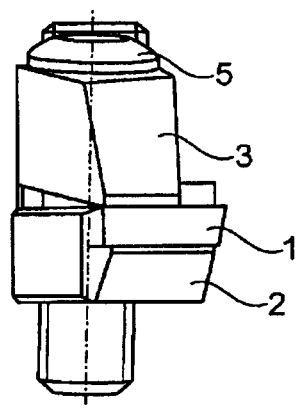
FIG. 5 shows a front view of the assembly shown in FIG. 3.

FIG. 4 shows a side view of the assembly shown in FIG. 3, and FIG. 5 discloses a front view of the assembly shown in FIG. 3. To clarify the mode of operation, FIG. 4 shows the cutting plate 1, the clamping holder 2, the clamping claw 3, and the tensioning, adjusting, and clamping screws 5 to 8 in the assembled state in a view from the same side as FIG. 1, but uncut, while, for simplification purposes, the main body 4 is omitted, similarly as described above for FIG. 3. In contrast to FIG. 1, the head of the adjusting screw 6 (cut in FIG. 1) can thus also be seen, for example. As can be seen from FIG. 4, the adjusting screw 6 is designed as grub screw in this embodiment, in the same way as the above-discussed adjusting screw 7 and the clamping screw 8.

The invention claimed is:

1. A cutting tool comprising a main body, which extends along a longitudinal central axis, and a cutting insert that is held on the main body in an axially and/or radially positionally adjustable manner, and which is capable of being tensioned by a clamping claw, wherein:
   the cutting insert is held in a cutting insert seat of a clamping holder, which is secured to the main body in a positionally adjustable manner and which is capable of being tensioned against the main body by the clamping claw, which presses against the cutting insert,
   the main body comprises a guide opening,
   the clamping claw is screw-connected to the main body by a tensioning screw, which extends through the clamping holder, and
   the guide opening prevents the clamping claw from moving in any direction other than along an axis of the tensioning screw.

2. The cutting tool according to claim 1, wherein the main body has a receiving pocket, which receives the clamping holder so as to be displaceable in a direction of displacement transversely to the longitudinal central axis.

3. The cutting tool according to claim 2, wherein the receiving pocket receives the clamping holder and holds the clamping holder in the axial direction.

4. The cutting tool according to claim 2, wherein the clamping holder is tensioned flat against a bearing surface, which extends in the direction of displacement of the clamping holder of the receiving pocket.

5. The cutting tool according to claim 4, wherein the bearing surface is flat.

6. The cutting tool according to claim 1, wherein the main body has a guide opening, which linearly guides the clamping claw to the clamping holder.

7. The cutting tool according to claim 6, wherein a direction of extension of the guide opening is inclined with respect to a bearing surface of a receiving pocket in such a way that the clamping claw presses the clamping holder against a stop on the main body.

8. The cutting tool according to claim 6, wherein the guide opening guides the clamping claw.

9. The cutting tool according to claim 1, wherein the cutting tool further comprises a securing device, which is independent of the clamping claw and which is integrated into the main body, for fixing the clamping holder to the main body.

10. The cutting tool according to claim 9, wherein the securing device is formed from a clamping screw, which is screw-connected to the main body and presses the clamping holder against the main body.

11. The cutting tool according to claim 1, wherein the cutting insert is arranged in the cutting insert seat at the clamping holder in a positionally immobile manner relative to the clamping holder.

12. The cutting tool according to claim 1, wherein the cutting insert is formed by a cutting plate.

13. The cutting tool according to claim 1, wherein the cutting tool further comprises an adjusting device, which is integrated into the clamping holder, for adjusting the radial and/or axial position of the clamping holder relative to the longitudinal central axis.

14. The cutting tool according to claim 13, wherein the adjusting device is an adjusting screw, which is screw-connected to the clamping holder and presses against the main body.

15. The cutting tool according to claim 1, wherein the cutting tool further comprises an adjusting device, which is integrated into the main body, for adjusting the radial and/or axial position of the clamping holder relative to the longitudinal central axis.

16. The cutting tool according to claim 15, wherein the adjusting device is formed from an adjusting screw, which is screw-connected to the main body and presses against the clamping holder.

17. The cutting tool according to claim 1, wherein the cutting insert is formed by an indexing insert.

18. A cutting tool comprising a main body, which extends along a longitudinal central axis, and a cutting insert that is held on the main body in an axially and/or radially positionally adjustable manner, and which is capable of being tensioned by a clamping claw, wherein:
the cutting insert is held by a clamping holder, which is secured to the main body in a positionally adjustable manner and which is capable of being tensioned against the main body by the clamping claw, which presses against the cutting insert,
the cutting tool further comprises an adjusting screw, and
the adjusting screw and the clamping holder are configured and positioned such that advancing the adjusting screw causes the clamping holder to be simultaneously displaced both axially and radially relative to the main body.

19. The cutting tool according to claim 18, wherein the main body has a receiving pocket, which receives the clamping holder so as to be displaceable in a direction of displacement transversely to the longitudinal central axis.

20. The cutting tool according to claim 18, wherein the cutting tool further comprises a securing device, which is independent of the clamping claw and which is integrated into the main body, for fixing the clamping holder to the main body.

21. The cutting tool according to claim 18, wherein the adjusting device is an adjusting screw, which is screw-connected to the clamping holder and presses against the main body.

* * * * *